G. A. MANFULL.
DISK CULTIVATOR.
APPLICATION FILED NOV. 1, 1911. RENEWED OCT. 17, 1912.
1,065,883.
Patented June 24, 1913.
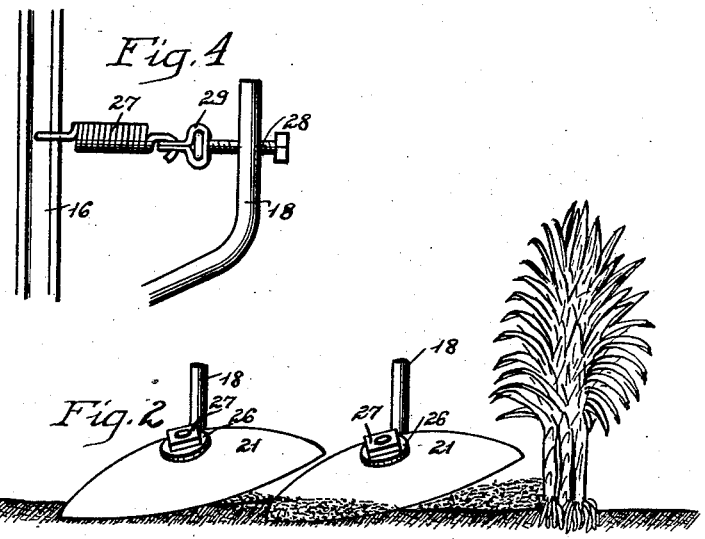
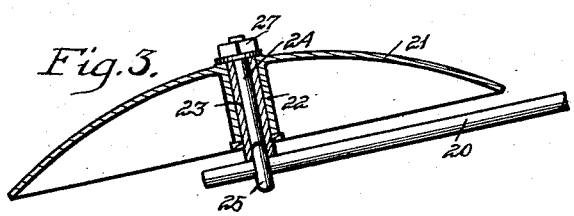
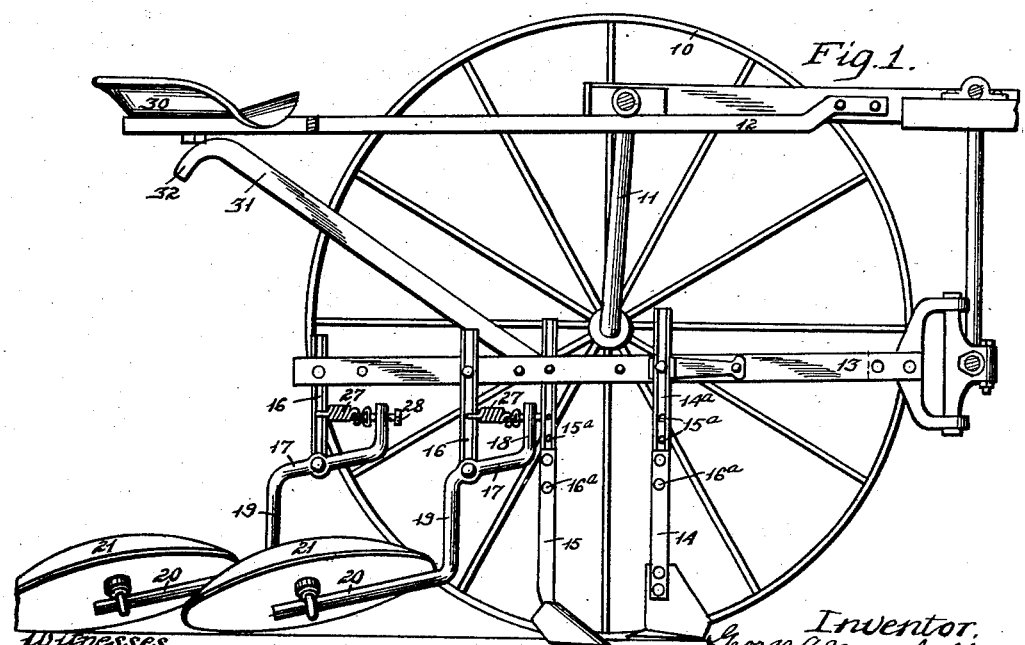

UNITED STATES PATENT OFFICE.

GEORGE A. MANFULL, OF BRIGHTON, COLORADO.

DISK CULTIVATOR.

1,065,883. Specification of Letters Patent. Patented June 24, 1913.

Application filed November 1, 1911, Serial No. 657,958. Renewed October 17, 1912. Serial No. 726,401.

*To all whom it may concern:*

Be it known that I, GEORGE A. MANFULL, a citizen of the United States, residing at Brighton, in the county of Adams and State of Colorado, have invented a certain new and useful Disk Cultivator, of which the following is a specification.

The object of my invention is to provide a disk cultivator whereby the ground adjacent to a row of beets or other crop is stirred or cultivated and whereby all the larger clods and pieces of dirt are crushed and broken into fine particles and the fine dirt and dust is thrown into a central ridge along the row.

A further object is to provide means whereby disks may be secured to plows, cultivators or the like in an almost horizontal position.

A further object is to provide means whereby disks on a cultivator may be adjusted as to their distance from the surface of the ground and the depth of their cut and as to the angle which they form with relation to the ground.

A further object is to provide simple and inexpensive means whereby the pressure of said disks against the surface of the ground may be regulated.

My invention consists in certain details in the construction, arrangement, and combination of the various parts of the device, whereby the objects contemplated are attained, as hereinafter more fully set forth, pointed out in my claims, and illustrated in the accompanying drawings, in which—

Figure 1 shows a central, vertical, sectional view of a cultivator embodying my invention. Fig. 2 shows a side elevation of two disks in the position with the relation to the ground, which they occupy when used on my cultivator. Fig. 3 shows a central, vertical, sectional view through a disk and the means for mounting the same. Fig. 4 shows a detail view of the means for regulating the pressure of the disks on the ground.

In the accompanying drawings, I have employed the reference numeral 10 to indicate the wheel of the cultivator. The wheels 10 are mounted on an axle 11 to which is secured a frame 12. The frame 12 and the wheels 10 may be of any suitable construction. My improved disk cultivator is preferably constructed to cultivate both sides of a row of beets or the like and has on each side the mechanism which I will now describe. Since these parts are the same on both sides, I will describe them only on one side.

Pivotally secured to the frame of the device, spaced apart from the middle thereof is a bar 13, capable of both vertical and lateral movement with the relation to the frame 12. Mounted on the inner side of the bar 13 is a weed knife 14. On the bar 13 in the rear of the weed knife 14 on the outer side of said bar 13 is mounted a duck foot 15. Mounted on the bar 13 rearwardly from the duck foot 15 are vertical arms 16. Pivotally mounted on the lower ends of the arms 16 are arms 17 which normally rest in an approximately horizontal position parallel with the bar 13. At the forward ends of the arms 17 are upward extensions 18. At the rearward ends are downward extensions 19 on the lower ends of which, are rearward extensions 20.

Disks 21 are mounted on the extensions 20 in the following manner: Disks 21 are provided with hubs 22 within which are sleeves 23. The disks 21 rotate freely on the sleeves 23. Within the sleeves are bolts 24 having at one end, eyes 25 which receive the rearward ends of the extensions 20 and slide freely thereon. On the other ends of the bolts 24 are washers 26 and nuts 27. One end of each sleeve 23 is provided with opposite slots in which are received respective sides of the eyes 25 so that the sides of the sleeve 23 may be brought into firm engagement with the extension 20, and by screwing the nut 27 farther upon the bolt 24 the sleeve is held between the washer 26 and the extension 20 and the disk is held firmly in position.

The extensions 20 are inclined rearwardly and slightly downwardly from the extensions 19. It will thus be seen that the disks are tilted so that their forward ends will be slightly raised above the level of the rearward ends of said disks. It will be seen that by unscrewing the nut 27, the sleeve 23 is released from engagement with the extension 20 and the disks 21 may be adjusted longitudinally on the extensions 20. Said disks may also be adjusted rotatably on said extensions 20 so that the angle which they form with the ground may be regulated at will. I preferably adjust my disks so that their sides next to the row are slightly raised above the level of their sides farthest from the row, as clearly shown in Fig. 1. Secured to each arm 16 opposite the upper end of the nearest extension 18 is a contractible coil spring 27. Mounted in the opening in each extension 18 is a screw 28 which is secured to the spring 27 by means of the spring 29. The tension of the spring 27 may be regulated by means of the screw 28. By means of the spring 27 the pressure of the disks on the surface of the ground is regulated and the depth of the cut of the disks may be varied.

The weed knives 14 and the ducks' feet 15 are secured to the arms 14$^a$ by means of bolts 16$^a$. The arms 14$^a$ are secured to the bar 13 in vertical position and are provided with a series of openings 15$^a$. The bolts 16$^a$ may be placed in any of the openings 15$^a$ and the depth of the cut of the weed knives and the ducks' feet 15 may thus be varied to meet the desire of the operator. The bar 13 is of considerable thickness and the forward arms 16 are arranged on the inner side of the bar 13 and the rear arms 16 are arranged on the outer side of the bar 13 so that the forward disk travels considerably closer to the row than the rearward disk. On the frame is arranged a suitable driver's seat 30. Lever arms 31 on which are handles 32 are secured to the respective bars 13 and extend to positions adjacent to the driver's seat 30. By means of the arms 31, the bars 13, and the disks 21 connected therewith may be moved laterally with the relation to the cultivator frame. In this way, the operator can cultivate as close to the rows of the crop or as far from them as he desires.

In the practical working of my improved disk cultivator, the weed knives 14 travel below the surface of the ground cutting all the weeds and the like in their path. The duck foot 15 on each side of the cultivator travels in front of the rearward disk 21 making a furrow. The forward disk 21 makes a furrow and throws the dirt taken therefrom into a ridge along the middle of the row under cultivation. The rearward disk 21 is preferably set to cut a deeper furrow than the forward disk and this is made easier on account of the furrow made by the duck foot 15. The dirt from the furrow made by the rearward disk 15 falls into the furrow made by the forward disk and completes the ridge along the row. Any large clods of dirt are ground under the disks 21 as the same rotate and are thoroughly broken up so that the dirt as finally deposited by the disks is in small particles. The pressure of the disks 21 upon the ground may be regulated by means of the spring 27 and the screw 28. If it is desired to vary the depth of the cut or the angle formed by the disks with the ground, the nut may be loosened in each case and the disk moved longitudinally on the extension 20 or tilted from side to side.

It will be noted that various modifications may be made in the construction of my device without departing from its essential spirit. My disks and the parts immediately connected therewith, including the arm 17 and its extensions and the arms 16 may be used on almost any ordinary cultivator or may be used upon disk cultivators or plows. I do not desire to confine myself to its use upon any particular machine.

The advantages of disks arranged as above described, and of the means for so arranging them are numerous. Among other things of advantage, pieces of dirt are thoroughly broken up and are then deposited in fine particles or in dust around the plants, forming a mulch. I have found that moisture is better conserved by such a disposition of the soil around the plant, and I have also found that weeds do not grow so well if surrounded by a fine dirt piled in a ridge such as that made by my device. My disks and the parts connected therewith are so constructed as to permit of adjustment in the ways heretofore spoken of, so that the manner of cultivation may be varied in a number of respects.

The means by which I accomplish the desirable objects above referred to are extremely simple and inexpensive.

In the following claims in referring to the forward edges of the disks, I mean their edges adjacent to the forward end of the cultivator and by their inner edges I mean the edges of the disks adjacent to the row of crop under cultivation.

I claim as my invention:

1. In a device of the class described, a cultivator frame mounted on wheels, disks, means for rotatably mounting the same on said frame in substantially horizontal position with their front edges slightly higher than the level of their rear edges, and with their inner edges slightly higher than the level of their outer edges, and adjustable yielding means for holding said disks against the surface of the ground.

2. In a device of the class described, a cultivator frame mounted on wheels, disks, means for rotatably mounting the same on said frame in substantially horizontal position with their front edges slightly higher than the level of their rear edges, and with their inner edges slightly higher than the level of their outer edges, and adjustable means for cutting furrows of varying depths in front of said disks.

3. In a device of the class described, a cultivator frame mounted on wheels, a downwardly extending arm on said frame, an extension extending downwardly and rearwardly from said arm, a disk formed with a hub, a sleeve said hub being rotatably mounted on said sleeve, a bolt in said sleeve having at one end an eye in which said extension is slidably mounted, a nut on the other end of said bolt, said sleeve being provided with opposite longitudinal slots to receive said eye, the end of said sleeve engaging said arm when said nut is screwed on said bolt.

4. In a device of the class described, a cultivator frame mounted on wheels, a downwardly extending arm mounted on said frame, a substantially horizontal arm pivotally mounted on said first named arm, a downward extension on said second arm, a rearward and downward extension on said first extension, a disk formed with a hub, a sleeve the hub being rotatably mounted thereon, a bolt in said sleeve having at one end an eye in which said extension is slidably mounted, a nut on the other end of said bolt, said sleeve being provided with opposite longitudinal slots to receive said eye, the end of said sleeve engaging said arm when said nut is screwed on said bolt.

5. In a device of the class described, a cultivator frame mounted on wheels, a downwardly extending arm mounted on said frame, a substantially horizontal arm pivotally mounted on said first named arm, a downward extension on said second arm, a rearward and downward extension on said first extension, a disk formed with a hub, a sleeve in said hub, said hub being rotatably mounted thereon a bolt in said sleeve having at one end an eye in which said extension is slidably mounted, a nut on the other end of said bolt, said sleeve being provided with opposite longitudinal slots to receive said eye, the end of said sleeve engaging said arm when said nut is screwed on said bolt, and means for exerting yielding pressure to hold said disk against the surface of the ground.

6. In a device of the class described, a cultivator frame mounted on wheels, a horizontal bar on said frame, a downwardly extending arm secured to the inner side of said bar, a downwardly extending arm secured to the outer side of said bar in the rear of said first named arm, a plurality of disks, means for mounting said disks on said arms each of said means comprising a substantially horizontal arm pivotally mounted on one of said downwardly extending arms, a downward extension on said horizontal arm, a rearward and downward extension on said first extension, a disk formed with a hub, a sleeve in said hub, said hub being rotatably mounted on said sleeve, a bolt in said sleeve having at one end an eye in which said extension is slidably mounted, a nut on the other end of said bolt, said sleeve being provided with opposite longitudinal slots to receive said eye, the end of said sleeve engaging said arm when said nut is screwed on said bolt.

Des Moines, Iowa, Oct. 14, 1911.

GEORGE A. MANFULL.

Witnesses:
FRANK HUNTER,
V. P. GLENN.

---

Copies of this patent may be obtained for five cents each, by addressing the "Commissioner of Patents, Washington, D. C."